United States Patent [19]

Cassidy

[11] Patent Number: 4,769,893
[45] Date of Patent: Sep. 13, 1988

[54] METHOD OF MAKING AN INTERNALLY SPLINED PRODUCT

[75] Inventor: Elmer R. Cassidy, Rosemont, Ill.

[73] Assignee: Candy Manufacturing Co., Evanston, Ill.

[21] Appl. No.: 89,220

[22] Filed: Aug. 25, 1987

[51] Int. Cl.[4] ............................................. B23P 17/00
[52] U.S. Cl. ........................................ 29/418; 29/456
[58] Field of Search ...................... 10/86; 29/418, 456; 411/432

[56] References Cited

U.S. PATENT DOCUMENTS 3,799,292  3/1974  Katz .................................. 411/432 X
4,091,520  5/1978  Wijnant et al. ................... 29/456 X Primary Examiner—Timothy V. Eley
Attorney, Agent, or Firm—McCaleb, Lucas and Brugman

[57] ABSTRACT

A double splined nut having internal left and right hand helical splines and a method for making the same is disclosed. Circumferentially spaced helical grooves are machined into the exterior of a cylindrical member which is then fitted into the cylindrical interior of a tubular body and bonded or otherwise rigidly affixed thereto. The grooved member is then axially bored to expose the previously formed external grooves, leaving the material between the grooves to form internal helical splines.

5 Claims, 1 Drawing Sheet

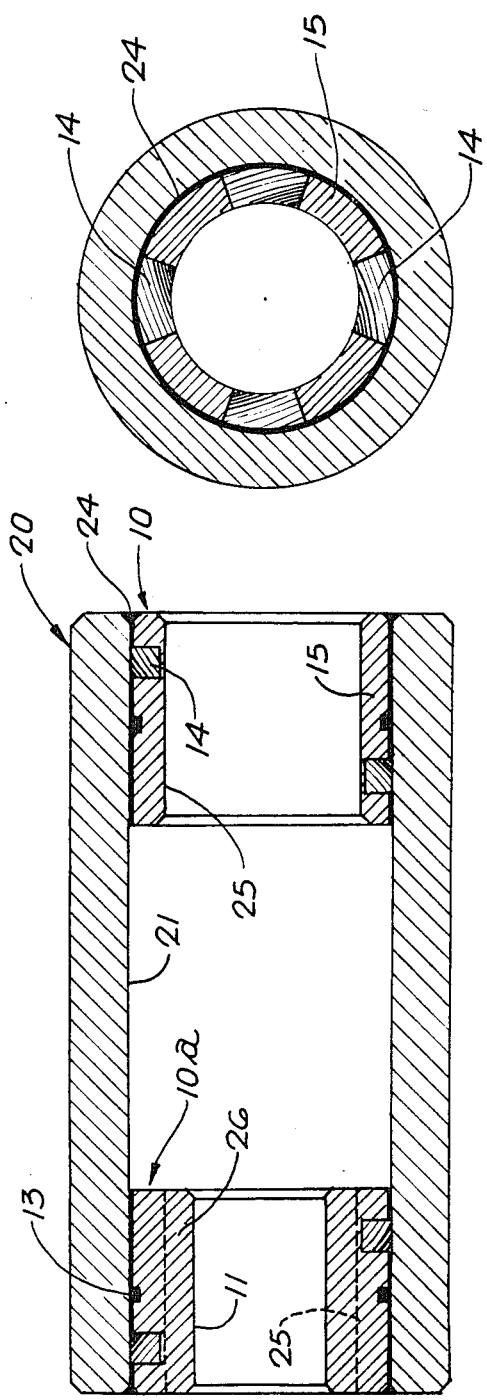
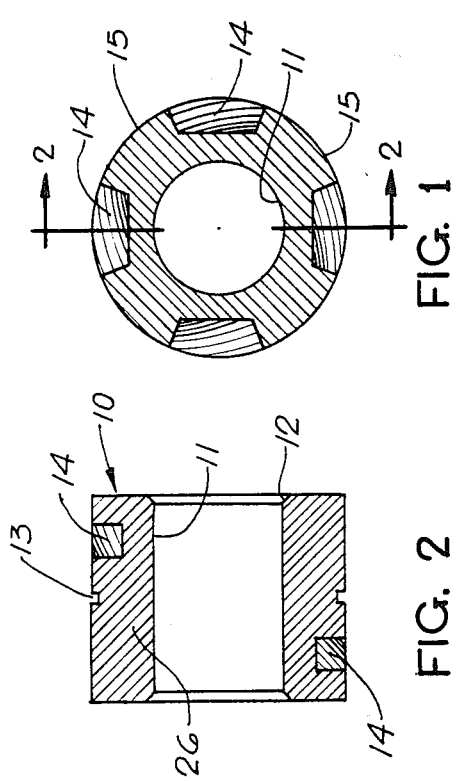

METHOD OF MAKING AN INTERNALLY SPLINED PRODUCT

This invention pertains to articles of manufacture having multiple internal helical splines and to an improved method for producing the same.

Forming a product having internal helical splines, such as a double splined nut, and particularly one having oppositely directed, i.e., left and right hand splines, does not lend itself readily to conventional machining operations such as broaching, milling or hobbing. Cutting multiple internal helical splines by machine lathe tools, for example, likewise is not only time consuming and expensive, but requires extreme skill and/or sophisticated controls to accomplish uniformity of the helical lands and grooves. Additionally, depending on the dimensions of the end product, space constrictions may further compound such a machining operation.

This invention overcomes the aforenoted difficulties by presenting an improved, simple, economical and accurate method of forming internal helical splines.

In brief the process of this invention is directed to the manufacture of internally splined products of any desired external configuration by a combination of procedural steps comprising, forming one or more circumferentially spaced helical grooves, separated by intervening lands, in the exterior of a cylindrical work piece, inserting such grooved work piece into a cylindrical chamber or bore provided in the body of the end product, rigidly affixing the grooved work piece to the walls of such cylindrical bore, and removing the core of the grooved work piece to expose the bottoms of the previously formed grooves thereby leaving, in situ, helical lands or splines.

It is a principal object of this invention to provide a new and improved method of making an internally helically splined product.

It is a further object of this invention to provide an improved method for forming internally splined products having both left and right hand helical splines.

A still further object of this invention is to provide an improved method of forming helical splines on the interior walls of a cylindrical bore wherein spaced helical splines are first formed on and about the exterior of a cylindrical work piece which is then inserted into the cylindrical bore, affixed thereto and subsequently axially bored to expose the previously formed splines.

Having described this invention, the above and further objects, features and advantages thereof will be recognized by those familiar with the art from the following description of a preferred embodiment of an end product formed in accordance with the improved method of this invention, as illustrated in the accompanying drawings.

In the Drawings

FIG. 1 is an end elevation of a cylindrical work piece formed with a plurality of external circumferentially spaced helical grooves and lands or splines;

FIG. 2 is a cross section thereof taken substantially along vantage line 2—2 of FIG. 1 and looking in the direction of the arrows thereon;

FIG. 3 is a longitudinal section of a tubular nut having a pair of work pieces of FIGS. 1 and 2 mounted within opposite ends of its cylindrical interior;

FIG. 4 is an end elevational view of the nut assembly illustrated in FIG. 3; and FIG. 5 is a perspective view showing a cut-away internal helically splined nut made in accordance with this invention in assembly with a pair of externally splined shaft members demonstrative of the operational use of the nut product.

DESCRIPTION OF THE PREFERRED EMBODIMENT

With reference now to FIGS. 1-4 of the drawings, it will be understood that the method of this invention will hereinafter be described in association with a tubular nut product having internal helical splines, one left handed and one right handed, for purposes of operatively engaging a pair of exteriorly splined shafts, as illustrated in FIG. 5.

While the double splined product shown in FIGS. 1-4 of the drawings, comprises two sets of oppositely directed internal splines it is to be understood that a tubular end product having a single set of internal splines likewise may be manufactured in accordance with the teachings of the method aspect of this invention.

With the foregoing in mind, it will be seen that a cylindrical metal insert member 10 (FIGS. 1 and 2) preferably is formed from cylindrical or solid stock to have a central axially extending pilot bore 11 having chamfered ends 12. The exterior of member 10 is then machined to provide a cylindrical surface concentric with bore 11 and one or more inwardly extending radial grooves 13 lying in a plane normal to the longitudinal axis of the member 10. The tubular work piece 10, so formed, is further processed, as by a conventional end mill operation, to provide a plurality of equal circumferentially spaced helical grooves 14 about its exterior (see FIG. 1). Such grooves extend radially inwardly of the exterior surface of the member 10 to a desired depth, but terminate short of the walls of the central pilot bore 11; preferably about half way through the wall thickness of the cylindrical member 10, as illustrated in FIGS. 1 and 2.

The formation of the spaced helical grooves 14 provides a corresponding plurality of intervening helical lands or splines 15,15 about the exterior of the insert member 10. In the particular illustrated instance, since the end product is to have both right hand and left hand internal helical splines, corresponding right hand and left hand helical grooves 14 are provided in two insert pieces 10 and 10a (see FIG. 3). The completed insert members 10 are then assembled coaxially within a body member 20 having an axially extending cylindrical bore 21, comprising the body of the nut product as shown in FIG. 3. In this latter regard, while body member 20 is herein shown of cylindrical, tubular configuration, its external surface may comprise formations as desired, depending on the end use of the particular product. For example, body member 20 may comprise a polygonal exterior affording wrench engageable surfaces, etc.

The radial grooves 13 transversely about the exterior of the insert members are provided for the purpose of receiving a length of brazing wire. The intermediate FIG. 3 assembly of the insert members 10, 10a and body 20 is subjected to a suitable heat bath to effect a brazed bond 24 between the exterior of the insert members and the interior of the cylindrical bore 21 in body member 20. Such condition is indicated in FIG. 3.

In the event material, such as plastic, is used for the body 20 and or insert members 10 for instance, other conventional means of interbonding such parts are employed.

Once the bonding step is completed, the sub assembled body and inserts are cylindrically bored to provide an enlarged cylindrical bore 25 through each of the insert members. This removes the material 26 (see FIG. 3) located radially between the bottoms of grooves 14 and the pilot bore 11.

It is to be noted that the bore 25 is of sufficient diameter to expose the bottoms of the several grooves 14, leaving the solid material between the grooves 14 to form helical splines which then may be finished to remove sharp corners, etc.

The double splined end product or nut member 30 is shown broken away in FIG. 5 to illustrate its engagement with a pair of externally splined shafts 31 and 32 having right and left hand external splines 33 and 34 intermeshing with correspondingly splines formed by the bored out inserts 10 and 10a respectively.

From the foregoing it is believed that those familiar with this art will readily recognize and appreciate the novel advancement presented by the described method of this invention for producing an internally splined product and will appreciate that while the same has been herein described in association with a preferred double splined nut, for purposes of illustrating the concepts of this invention, the same is susceptible to variation, modification and substitution of equivalents without departing from the spirit and scope of this invention as hereinafter defined in the appended claims.

I claim:

1. A method of manufacturing an article having internal helical splines, comprising the steps of:
   forming a first cylindrical walled bore in a body member of the article;
   forming a plurality of spaced helical grooves separated by intervening helical splines in and about the exterior of a cylindrical insert member having an external diameter freely receptive in said first bore;
   mounting said insert member concentrically within said first bore;
   positively bonding said insert member to the walls of said first bore; and
   forming a second cylindrical bore coaxially of the interbonded body and insert members and of sufficient diameter to expose the radially inner ends of said helical grooves and splines.

2. The method of claim 1, wherein said insert member has an annular cross section and said grooves have a radial depth less than the thickness of said cross section.

3. The method of claim 1, wherein said body and member are metal, and said member is brazed to the walls of said first bore.

4. The method of claim 1, wherein a pair of said insert members, having reversely directed exterior helical grooves and splines are affixed in said first bore, whereby the resulting article is provided with left and right hand internal helical splines.

5. An article having internal helical splines, made according to the method of claim 4.

* * * * *